United States Patent
Farkash et al.

(10) Patent No.: US 10,032,043 B2
(45) Date of Patent: Jul. 24, 2018

(54) MASKING SENSITIVE DATA IN MOBILE APPLICATIONS

(71) Applicant: International Business Machines Corporation, Armonk, NY (US)

(72) Inventors: Ariel Farkash, Shimshit (IL); Abigail Goldsteen, Haifa (IL); Micha G. Moffie, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 14/753,404

(22) Filed: Jun. 29, 2015

(65) Prior Publication Data

US 2016/0379010 A1    Dec. 29, 2016

(51) Int. Cl.
*G06F 21/62*    (2013.01)

(52) U.S. Cl.
CPC ................ *G06F 21/6245* (2013.01)

(58) Field of Classification Search
CPC .... G06F 21/62; G06F 21/606; G06F 21/6263; H04L 63/0428; H04L 63/168
USPC .......................................... 726/1, 26, 28-30
See application file for complete search history.

(56) References Cited

U.S. PATENT DOCUMENTS

| | | | |
|---|---|---|---|
| 8,893,280 B2 | 11/2014 | Jung et al. | |
| 8,898,796 B2 | 11/2014 | Ben-Natan et al. | |
| 8,930,381 B2 | 1/2015 | Raghunathan et al. | |
| 2010/0125637 A1* | 5/2010 | Gonda | H04L 12/583 709/206 |
| 2011/0314278 A1* | 12/2011 | Taskaya | H04L 9/28 713/167 |
| 2014/0068706 A1* | 3/2014 | Aissi | G06F 21/6254 726/1 |
| 2014/0283127 A1 | 9/2014 | Chacko et al. | |
| 2015/0113659 A1* | 4/2015 | D'Costa | G06F 21/60 726/26 |

(Continued)

FOREIGN PATENT DOCUMENTS

WO    2012127322 A1    9/2012

OTHER PUBLICATIONS

Application- and User-Sensitive Privacy Enforcement in Mobile Systems, Tripp et al, 10.1109/MobileSoft.2015.45, IEEE, May 2015 (Year: 2015).*

(Continued)

*Primary Examiner* — Jahangir Kabir
(74) *Attorney, Agent, or Firm* — Maeve M. Carpenter; Christopher McLane

(57) ABSTRACT

In an approach to masking data in a software application associated with a mobile computing device, one or more computer processors receive a request to display data in a software application on a mobile computing device. The one or more computer processors determine whether one or more masking rules apply to the data, where determining whether one or more masking rules apply to the data is performed by an instrumentation of application binary of the software application. In response to determining that one or more masking rules apply to the data, the one or more computer processors mask, based on the one or more masking rules, the data, where masking is performed by the instrumentation of application binary of the software application.

17 Claims, 5 Drawing Sheets

(56) References Cited

U.S. PATENT DOCUMENTS

2015/0283903 A1* 10/2015 Kondo .................... G06F 21/62
345/619
2015/0319141 A1* 11/2015 Jang ........................ H04W 4/21
726/26

OTHER PUBLICATIONS

Cooley, "Screen Capture for Sensitive Systems", Dartmouth Computer Science Technical Report—TR 690-2011, May 2011, 128 pages, <http://www.ists.dartmouth.edu/library/509.pdf>.
Goldsteen et al., "Application_Screen Masking: A Hybrid Approach", Web 2.0 Security and Privacy Workshop, May 2014, 10 pages, <http://w2spconf.com/2014/papers/ScreenMaskingW2SP.pdf>.
Hao et al., "SIF: A Selective Instrumentation Framework for Mobile Applications", MobiSys '13, Jun. 25-28, 2013, 14 pages, <http://www-bcf.usc.edu/~halfond/papers/hao13mobisys.pdf>.
Kepes, "Latest Enterprise Application Use Surveys Results—More Use, More Risk", Forbes, Tech, Jul. 31, 2014, 6 pages, <http://www.forbes.com/sites/benkepes/2014/07/31/latest-enterprise-application-use-survey-results-more-use-more-risk/>.
Kiczales et al., "An Overview of Aspectj", European Conference on Object-Oriented Programming, Published Jun. 18, 2001, pp. 327-354, <http://www.ccs.neu.edu/home/lieber/com3362/w02/lectures/working-lectures/ECOOP2001-Overview.pdf>.
Lin et al., "SPADE: Scalable App Digging With Binary Instrumentation and Automated Execution", Microsoft Research, 12 pages, <http://research.microsoft.com/pubs/206889/main.pdf>.

* cited by examiner

MASKING SENSITIVE DATA IN MOBILE APPLICATIONS

BACKGROUND OF THE INVENTION

The present invention relates generally to the field of mobile computing, and more particularly to masking sensitive data in mobile applications.

Enterprises attempt to strike a balance between protecting their sensitive data while allowing their personnel to utilize that sensitive data when needed in the operations of the enterprise, both internally and externally. Sensitive data often consists of employee, customer, partner, and vendor records containing sensitive details, for example, names of individuals, addresses, telephone numbers, email addresses, social security numbers, credit card information, health insurance details, health records, and financial records. Such sensitive information is often shared through a variety of applications, including mobile applications, which may be viewed internally and externally with proper authorization. Enterprises take steps to keep such sensitive data private both to protect their own interests and the interests of their clients, partners, and customers. Much of this data is required by law to be kept private. For example, the Payment Card Industry Data Security Standard (PCI DSS) act makes it mandatory for credit card payment processing companies to maintain data confidentiality while storing, processing, and exchanging credit card data.

Another problem enterprises face is that the definitions of who can or cannot see certain data may change over time. Changes in regulations and security/privacy policies can limit which employees have access to certain types of data such as personally identifiable information (PII) and protected health information (PHI). Also, if an enterprise decides to outsource operations, there can be issues of data privacy and security. For example, a call center application written ten years ago when customer service agents were all internal employees may not be easily used when the customer service agents are outsourced to an external enterprise and even more so when these agents no longer work in the same country. In the previous examples, the enterprise may need to substantially modify or rewrite the application to comply with new or modified privacy and security requirements.

SUMMARY

Embodiments of the present invention disclose a method, a computer program product, and a system for masking data in a software application associated with a mobile computing device. The method may include one or more computer processors receiving a request to display data in a software application on a mobile computing device. The one or more computer processors determine whether one or more masking rules apply to the data, wherein determining whether one or more masking rules apply to the data is performed by an instrumentation of application binary of the software application. In response to determining that one or more masking rules apply to the data, the one or more computer processors mask, based on the one or more masking rules, the data, wherein masking is performed by the instrumentation of application binary of the software application.

DETAILED DESCRIPTION

Organizations and enterprises may need to prevent certain, or all, users from viewing personally identifiable information (PII) or other sensitive data contained in applications, and the requirements may change over time. This situation may inhibit the use of off-the-shelf mobile applications, and increase the burden on organizations that subsequently need to develop or modify applications in-house in order to preserve sensitive data and keep up with current regulations regarding PII. Developing applications from scratch, especially for an abundance of different operating systems (OS) and form factors, is a tedious and costly process, in addition to the maintenance and support of the applications once deployed. Embodiments of the present invention recognize that efficiency can be gained by masking sensitive information in an existing mobile application using an approach that masks the information just before the information is displayed and does not require access to the application code or back-end code. Implementation of embodiments of the invention may take a variety of forms, and exemplary implementation details are discussed subsequently with reference to the Figures.

Figure 1:
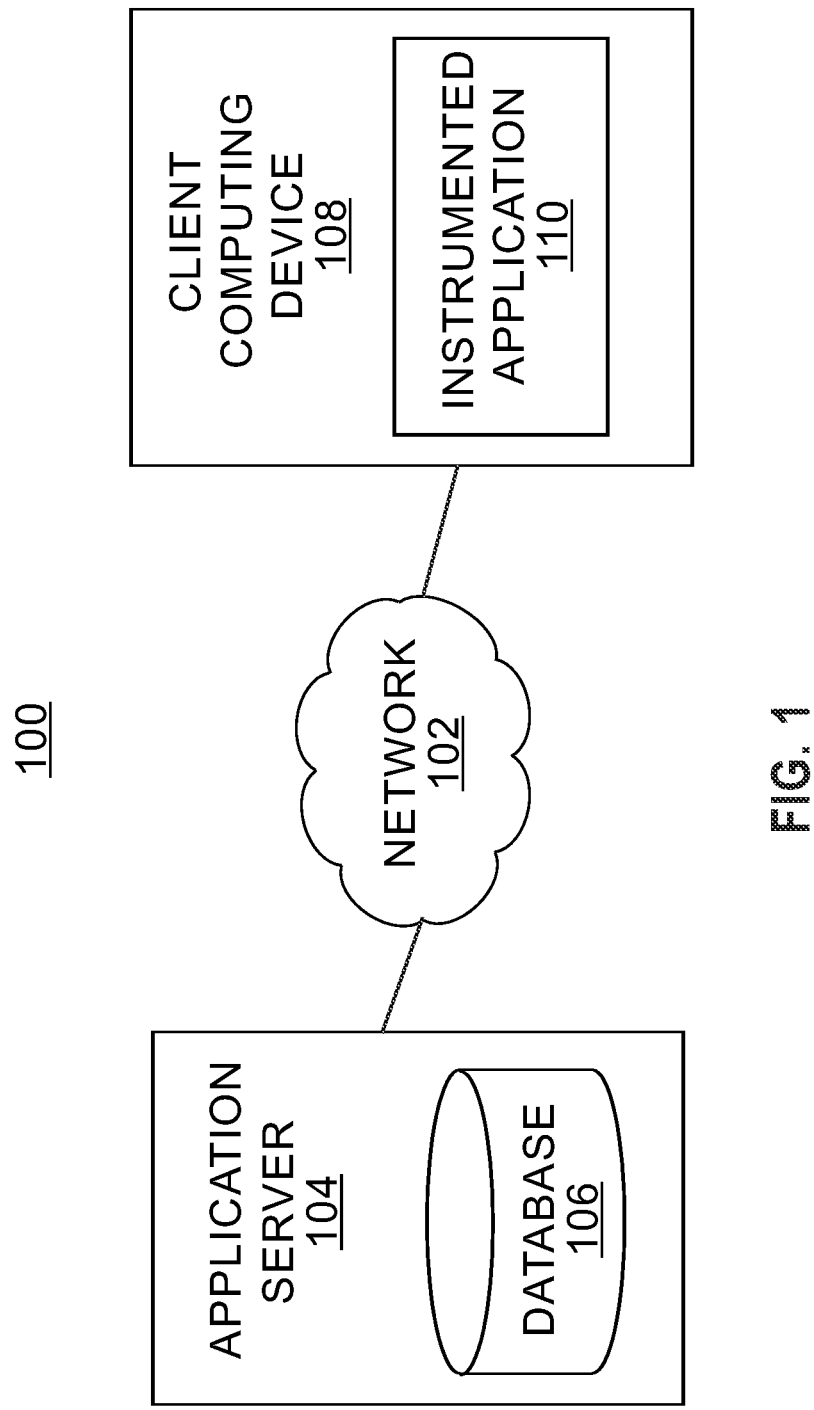
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes application server 104 and client computing device 108, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between application server 104, client computing device 108, and other computing devices (not shown) within distributed data processing environment 100.

Application server 104 is a piece of middleware that connects back-end systems to the users that need to access them. The function of application server 104 is dedicated to the efficient execution of procedures, such as programs, routines, and scripts, for supporting its applied applications. In various embodiments, application server 104 may be an application server, a mobile application server, a cloud-based server, or a web server. Application server 104 includes database 106.

In the depicted embodiment, database 106 resides on application server 104. In another embodiment, database 106 can reside elsewhere in distributed data processing environment 100 provided application server 104 has access to database 106. A database is an organized collection of data. Database 106 can be implemented with any type of storage device capable of storing data and configuration files that can be accessed and utilized by application server 104, such as a database server, a hard disk drive, or a flash memory. Database 106 stores data belonging to an organization or enterprise that includes PII or other sensitive information. In another embodiment, PII and other sensitive information may be stored elsewhere in distributed data processing environment 100.

Client computing device 108 can be a laptop computer, a tablet computer, a smart phone, or any programmable electronic device capable of communicating with various components and devices within distributed data processing environment 100, via network 102. In an exemplary embodiment of the present invention, client computing device 108 is a mobile computing device. In the embodiment, the mobile computing device can operate on one or more of a plurality of operating systems and platforms, as are known in the art. Client computing device 108 can be a wearable computer. Wearable computers are miniature electronic devices that may be worn by the bearer under, with or on top of clothing, as well as in glasses, hats, or other accessories. Wearable computers are especially useful for applications that require more complex computational support than just hardware coded logics. In general, client computing device 108 represents any programmable electronic device or combination of programmable electronic devices capable of executing machine readable program instructions and communicating with other computing devices (not shown) within distributed data processing environment 100 via a network, such as network 102. Client computing device 108 includes instrumented application 110.

Instrumented application 110 is one of a plurality of mobile application software, i.e., apps, which are computer programs typically designed to run on smart phones, tablet computers, and other mobile computing devices, that has been subsequently instrumented. Instrumentation is the process of modifying an application to enable monitoring, profiling, or other program analysis tasks. Instrumentation is implemented by adding instructions to a program which are able to intercept the execution of the program when needed, extract necessary information, and alter the program's execution. Instrumented application 110 includes instrumentation that enables masking of sensitive data just before instrumented application 110 displays the sensitive data to a user. An example of an instrumentation process is depicted and described in further detail with respect to FIG. 2. Instrumented application 110 is depicted and described in further detail with respect to FIGS. 3A and 3B.

Figure 2:
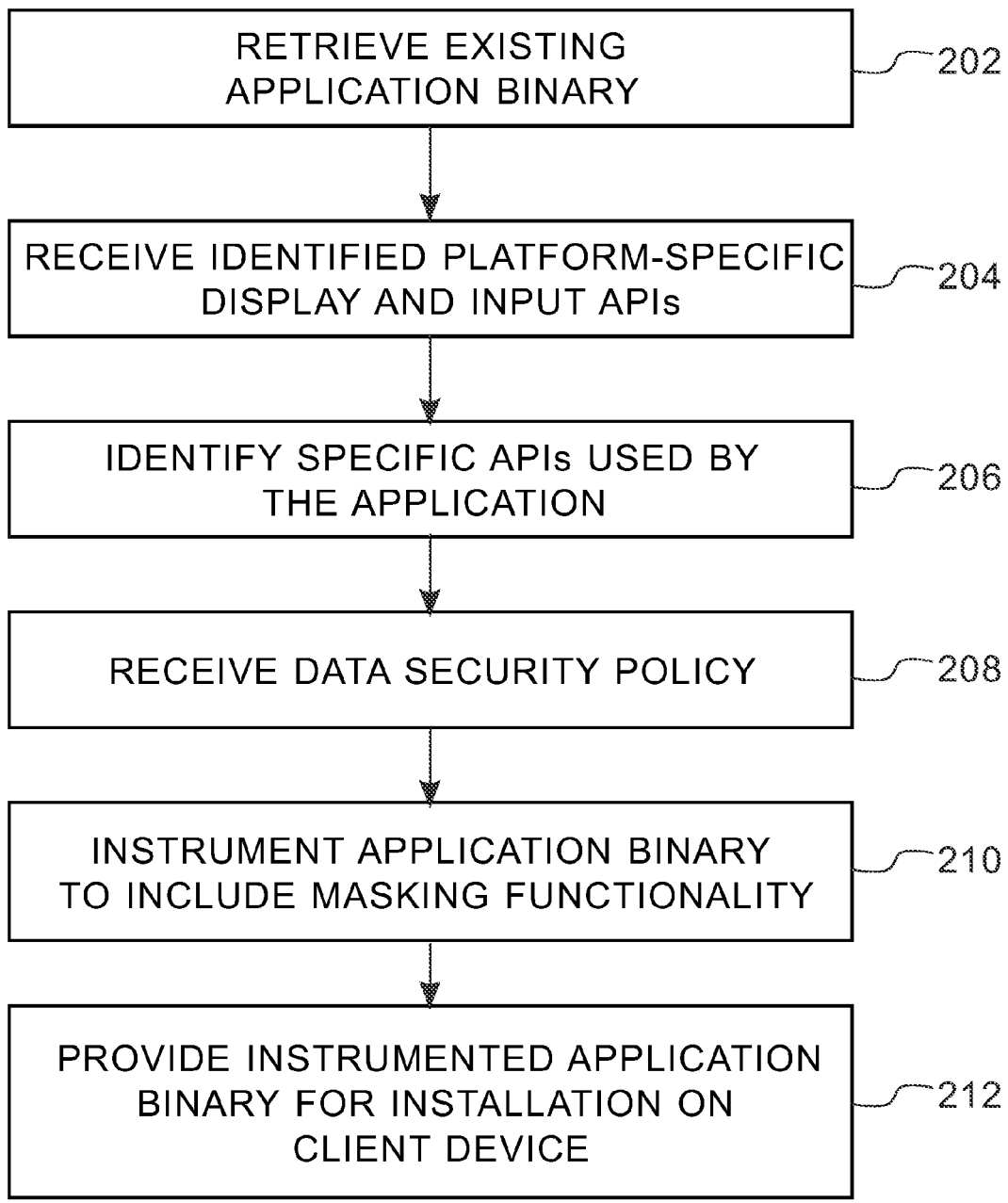
FIG. 2 depicts a block diagram of an example of tasks a software developer performs when instrumenting an application, in accordance with an embodiment of the present invention.

FIG. 2 depicts a block diagram of an example of tasks a software developer performs when instrumenting an application, in accordance with an embodiment of the present invention. In an embodiment, the tasks described with respect to FIG. 2 may also be performed by a computer.

In block 202, a software developer retrieves existing application binary. As part of an enterprise, the software developer knows which applications will be loaded onto employees' devices. This allows the software developer to create instrumented applications for the applicable applications. In one embodiment, human resources personnel instruct the software developer which applications require data masking functionality. When instrumenting an application, the software developer begins with the compiled format of the application. Depending on the programming language, the application binary can be an executable file that is run directly on the operating system, or the application binary can also be an intermediate representation which is run by an interpreter. Bytecode in Java® is an example of an intermediate representation. (Java® and all Jave-based trademarks and logos are trademarks or registered trademarks of Oracle® and/or its affiliates.)

In block 204, the software developer receives a list of one or more platform-specific display and input application programming interfaces (APIs) identified by a platform expert. The platform expert, i.e., someone familiar with the platform, provides a list of API methods that can be called by an application using the particular platform to display data to and to receive data input from the screen of a particular mobile device.

In block 206, the software developer identifies the specific APIs used by the application. The software developer reviews the list of APIs provided by the platform expert and identifies the specific APIs used for data display and input, i.e., screenwriting APIs, by the application the software developer is currently instrumenting. For example, if the application is on an Android® platform, the software developer may choose to instrument the TextView.setText( ) API which is used to display text elements. (Android® and all Android-based trademarks and logos are trademarks or registered trademarks of Google® and/or its affiliates.) In another example, if data that will be masked is typically displayed in an editable screen where the user may input or change one or more of the values, the software developer may instrument the TextView.getText( ) API to return a masked value to its original value, thus preserving the application's functionality. In an embodiment where the specific APIs used by the application cannot be identified, the software developer can instrument one or more APIs on the provided list.

In block 208, the software developer receives a data security policy. In an organization or enterprise, a privacy officer or a data security officer may create a data security policy that defines what PII or sensitive data needs to be masked. For example, the privacy officer may define that users accessing the application are not allowed to view social security numbers belonging to other users. In one embodiment, the software developer receives the data security policy and implements content-based techniques, such as regular expressions or more complex text classifiers, such that the instrumented application prevents display of sensitive information as defined by the security policy. In another embodiment, the software developer may employ other techniques, as known in the art, to prevent the display of sensitive information.

In block 210, the software developer instruments the application binary to include masking functionality. In an exemplary embodiment, the software developer instruments the application binary, making the instrumentation feasible for enterprises where employees have many different devices and OS versions. In the embodiment, the software developer adds the masking functionality without recoding the existing application. The masking functionality can include transforming the sensitive data in one or more techniques, such as covering the data, such that the data is not visible, or replacing the data with different values. For example, the software developer can instrument the application such that the application replaces all phone numbers with a random token. In one embodiment, the software developer can apply format-preserving encryption to conserve the original format of the data.

In an example of instrumenting the application binary on an Android® platform, the software developer can choose AspectJ for instrumentation framework because Android® applications are written in Java®. AspectJ is an extension to the Java® programming language to support aspect oriented programming (AOP). The software developer may start with an Android® application package (APK), which is a package file format used to distribute and install application software and middleware onto Google's® Android® operating system. If the source code is not available, the software developer extracts a Dalvik Executable (.dex) file from the APK. The software developer then converts the .dex file to a Java® .jar file that contains .class files. Next, the software developer creates an AspectJ project, imports the .jar file, defines relevant pointcuts, and programs the aspects. The software developer then weaves in the aspects, thus producing a new .jar file that contains updated .class files, as well as the AspectJ runtime. Next, the software developer can convert the updated .class files into .dex files. Finally, the software developer updates the APK with the new instrumented .dex files and signs the updated APK.

In block 212, the software developer provides the instrumented application binary for installation on a client computing device. In an embodiment where an enterprise provides an employee with a device pre-loaded with needed applications, the software developer provides the instrumented application to the Information Technology (IT) department of the enterprise to use when preparing mobile devices for distribution to employees. In an embodiment where an employee uses either a personal device or an enterprise device that does not include pre-installed software, the software developer provides the instrumented application to the employee for installation on the device. In a further embodiment, the enterprise may upload the instrumented application to an enterprise application store from which an employee can download the instrumented application.

Figure 3A:
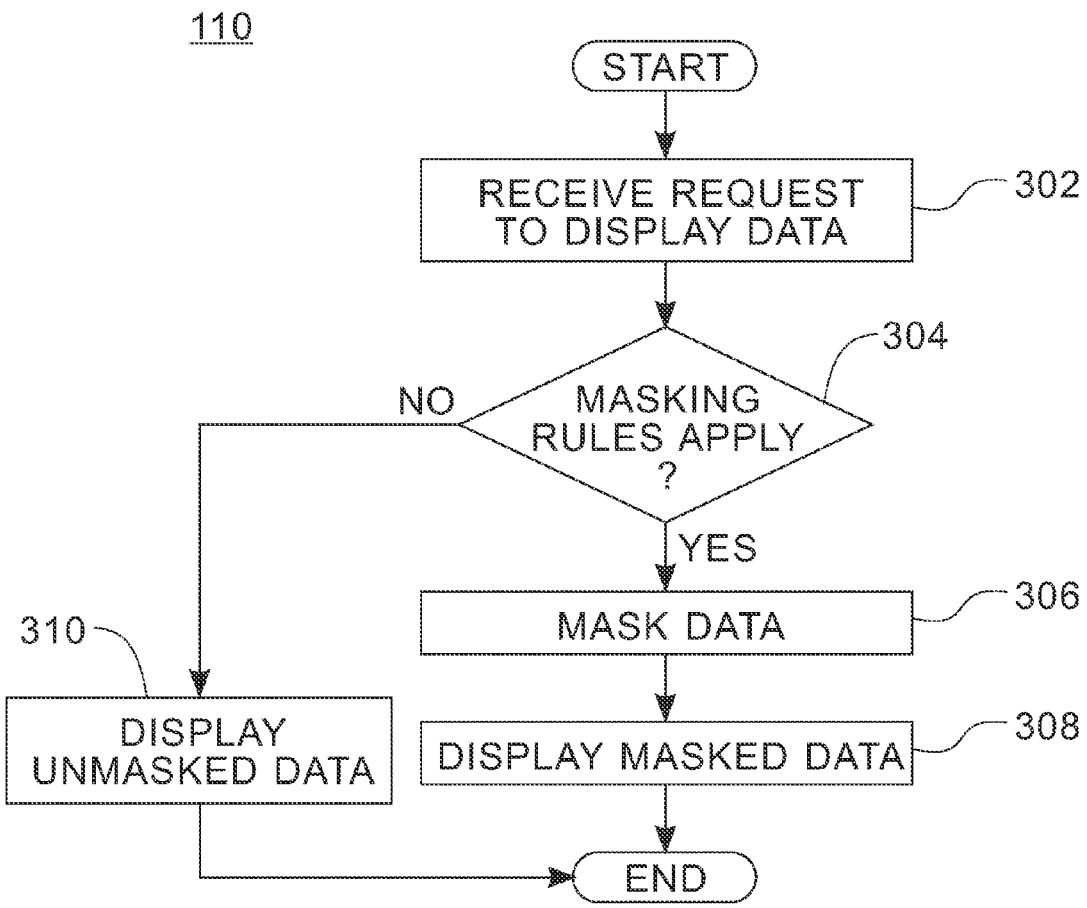
FIGS. 3A and 3B illustrate operational steps of an instrumented application, on a client computing device within the distributed data processing environment of FIG. 1, for masking and unmasking sensitive data, in accordance with an embodiment of the present invention.
Figure 3B:
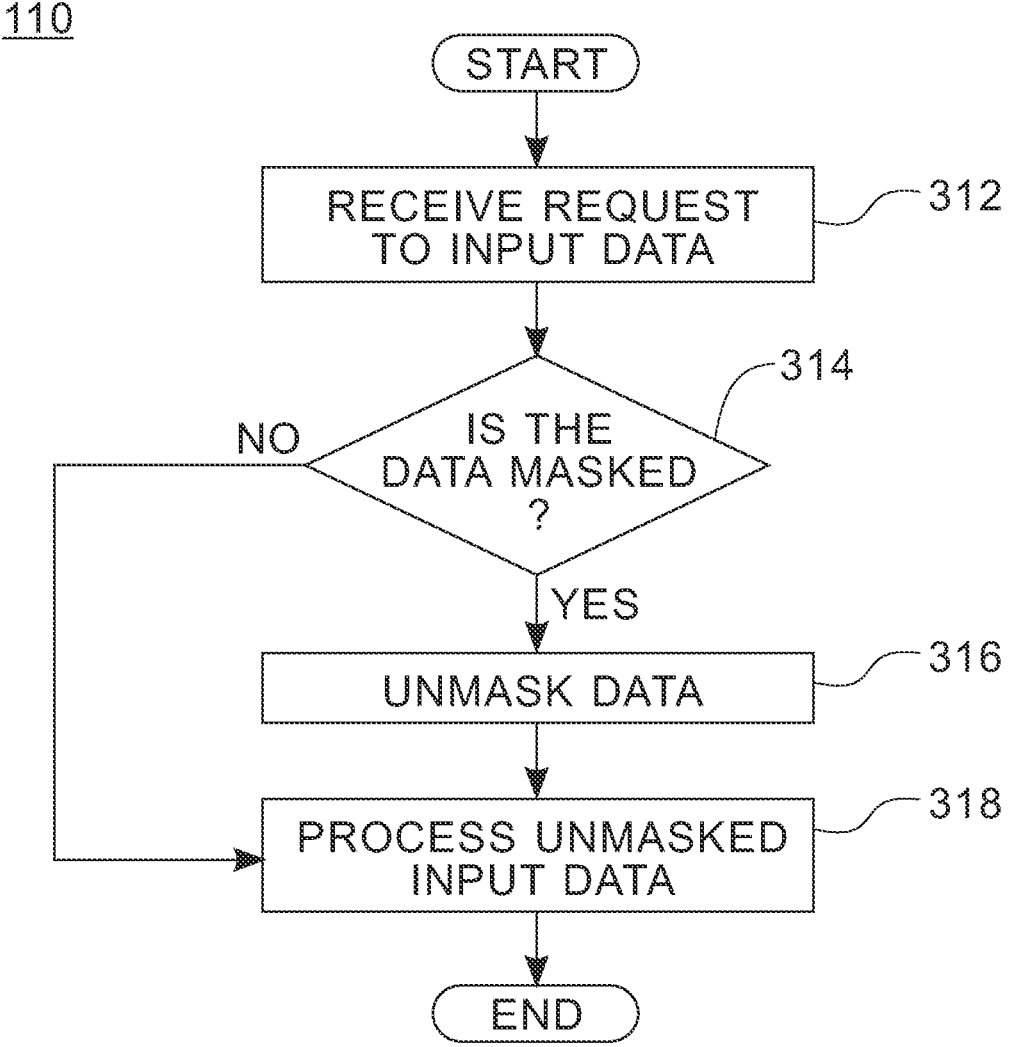

FIGS. 3A and 3B illustrate operational steps of instrumented application 110, on client computing device 108 within distributed data processing environment 100 of FIG. 1, for masking and unmasking sensitive data, in accordance with an embodiment of the present invention.

FIG. 3A depicts operational steps of instrumented application 110 for masking data. Instrumented application 110 receives a request to display data (step 302). A user of client computing device 108 launches instrumented application 110 and performs a task that includes a request to display data. In one embodiment, the requested data is stored in database 106. In another embodiment, the requested data may be computed on demand. In a further embodiment, the requested data may be sent by another user within distributed data processing environment 100.

Instrumented application 110 determines whether masking rules apply (decision block 304). Instrumented application 110 analyzes the received request and determines whether the requested data includes PII or sensitive data, and, if so, also determines whether the user is authorized or unauthorized to view the data. As discussed with respect to FIG. 2, a data security policy defines which data is sensitive and which users are allowed access to sensitive data. In one embodiment, instrumented application 110 includes context-based rules that describe the defined data security policy, are based on the visual structure of the screen, i.e., the presentation layer, and can incorporate user interface constructs, such as labeled fields, table columns, drop-down boxes, etc. For example, a context-based rule can mask all labeled fields in which the label is "Email Address." In another embodiment, instrumented application 110 includes content-based rules that take into consideration only the context of the text and can be defined either by regular expressions or more advanced text analytic tools. Instrumented application 110 compares the requested data to the masking rules and determines whether the masking rules apply.

If instrumented application 110 determines the masking rules apply ("yes" branch, decision block 304), then instrumented application 110 masks the data (step 306). As discussed with respect to FIG. 2, the masking functionality of instrumented application 110 can include transforming the sensitive data in one or more techniques, such as covering the data, such that the data is not visible, or replacing the data with different values. Instrumented application 110 uses the masking functionality instrumented in the application binary to mask at least a portion of the sensitive data. In an embodiment, screen masking can also be used to mask a sensitive action, such as preventing a user from clicking on a web link and thereby reaching a sensitive page.

Responsive to masking the data, instrumented application 110 displays the masked data (step 308). In one embodiment, instrumented application 110 displays blank spaces where masked data resides on the screen of client computing device 108. In another embodiment, instrumented application 110 displays different data that replaces the sensitive data. In yet another embodiment, instrumented application 110 may display a message, such as "user is not authorized to view the requested data."

If instrumented application 110 determines the masking rules do not apply ("no" branch, decision block 304), then instrumented application 110 displays unmasked data (step 310). Instrumented application 110 displays data in an unmasked format.

FIG. 3B depicts operational steps of instrumented application 110 for unmasking data. Instrumented application 110 receives a request to input data (step 312). In an embodiment where instrumented application 110 is interactive and can receive data input in addition to displaying data, instrumented application 110 receives a request from a user to input data. For example, a user may be updating an existing account where some data is already masked, and begins a process of entering or editing required information.

Instrumented application 110 determines whether data is masked (decision block 314). Instrumented application 110 determines whether masking is in place in one or more fields. If instrumented application 110 determines that data is masked ("yes" branch, decision block 314), then instrumented application 110 unmasks the data (step 316). Instrumented application 110 unmasks the previously masked data to enable subsequent processing of the data without revealing the data to the user. For example, when the user presses a "submit" button on an editable screen that contains masked data without editing any fields that contain masked data, instrumented application 110 unmasks the previously masked data.

Responsive to unmasking the data, or if instrumented application 110 determines the data is not masked ("no" branch, decision block 314), then instrumented application 110 processes unmasked data (step 318). Instrumented application 110 processes all data, whether the data was previously masked or not, per the application functionality.

Figure 4:
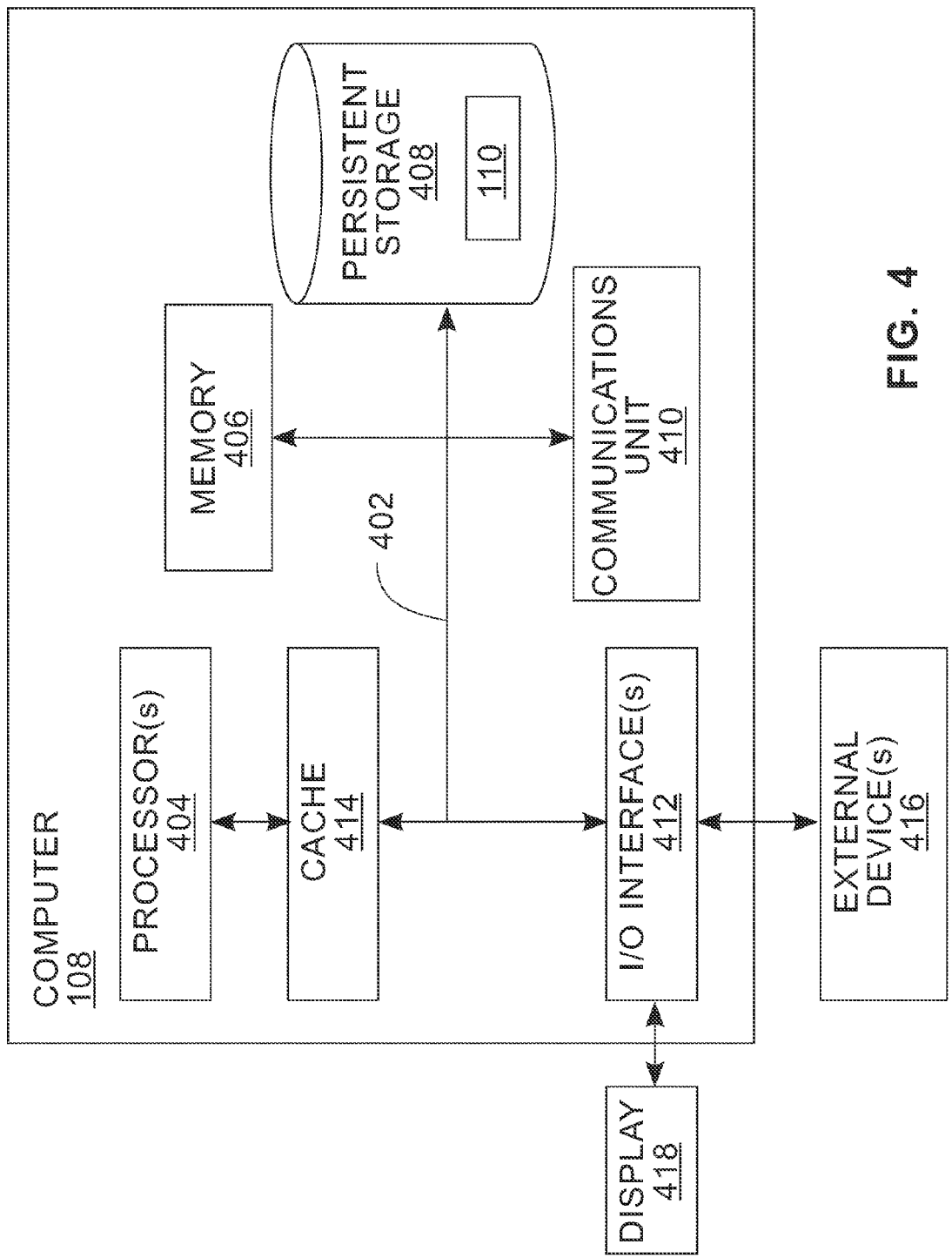
FIG. 4 depicts a block diagram of components of the client computing device executing the instrumented application within the distributed data processing environment of FIG. 1, in accordance with an embodiment of the present invention.

FIG. 4 depicts a block diagram of components of client computing device 108 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Client computing device 108 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., instrumented application 110, are stored in persistent storage 408 for execution by one or more of the respective processor(s) 404 of client computing device 108 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of application server 104. In these examples, communications unit 410 includes one or more network interface cards. Communications unit 410 may provide communications through the use of either or both physical and wireless communications links. Instrumented application 110 may be downloaded to persistent storage 408 of client computing device 108 through communications unit 410.

I/O interface(s) 412 allows for input and output of data with other devices that may be connected to client computing device 108. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., instrumented application 110 on client computing device 108, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for masking data in a software application associated with a mobile computing device, the method comprising:

receiving, by one or more computer processors, a request to display data in a software application on a mobile computing device;

determining, by the one or more computer processors, whether one or more masking rules apply to the data, wherein determining whether one or more masking rules apply to the data is performed by masking functionality instrumented in an application binary of one or more application programming interfaces (APIs) used by the software application for at least data display or data input, and wherein instrumentation is implemented by adding instructions to the application binary of the one or more APIs used by the software application which are able to intercept the execution of the software application and enable masking of sensitive data prior to displaying sensitive data;

responsive to determining that one or more masking rules apply to the data, masking, by the one or more computer processors, based on the one or more masking rules, the data, wherein masking is performed by the masking functionality instrumented in the application binary of the one or more APIs used by the software application;

receiving, by the one or more computer processors, a request to perform a sensitive action on a screen of the mobile computing device;

masking, by the one or more computer processors, the screen of the mobile computing device to prevent the sensitive action; and displaying, by the one or more computer processors, a message on the screen of the mobile computing device, wherein the message indicates that the user is not authorized to view the requested data.

2. The method of claim 1, wherein the masking functionality instrumented in the application binary of the one or more APIs used by the software application is designed to prevent a display of sensitive data to an unauthorized user.

3. The method of claim 1, wherein masking the data includes at least covering data or replacing data.

4. The method of claim 1, wherein the one or more masking rules includes at least one or more context-based rules and one or more content-based rules.

5. The method of claim 1, wherein the one or more masking rules are defined by a data security policy.

6. The method of claim 1, further comprising:
responsive to masking the data, receiving, by the one or more computer processors, data input replacing at least a portion of the masked data; and
returning, by the one or more computer processors, the masked data to an original value.

7. The method of claim 1, further comprising:
responsive to masking the data, receiving, by the one or more computer processors, data input; and
unmasking, by the one or more computer processors, the masked data.

8. A computer program product for masking data in a software application associated with a mobile computing device, the computer program product comprising:
one or more computer readable storage device and program instructions stored on the one or more computer readable storage device, the stored program instructions comprising:
program instructions to receive a request to display data in a software application on a mobile computing device;
program instructions to determine whether one or more masking rules apply to the data, wherein program instructions to determine whether one or more masking rules apply to the data are performed by masking functionality instrumented in an application binary of one or more application programming interfaces (APIs) used by the software application for at least data display or data input, and wherein instrumentation is implemented by adding instructions to the application binary of the one or more APIs used by the software application which are able to intercept the execution of the software application and enable masking of sensitive data prior to displaying sensitive data;
responsive to determining that one or more masking rules apply to the data, program instructions to mask, based on the one or more masking rules, the data, wherein program instructions to mask are performed by masking functionality instrumented in the application binary of the one or more APIs used by the software application;
program instructions to receive a request to perform a sensitive action on a screen of the mobile computing device;
program instructions to mask the screen of the mobile computing device to prevent the sensitive action; and
program instructions to display a message on the screen of the mobile computing device, wherein the message indicates that the user is not authorized to view the requested data.

9. The computer program product of claim 7, wherein the masking functionality instrumented in the application binary of the one or more APIs used by the software application is designed to prevent a display of sensitive data to an unauthorized user.

10. The computer program product of claim 7, wherein the one or more masking rules includes at least one or more context-based rules and one or more content-based rules.

11. The computer program product of claim 7, wherein the one or more masking rules are defined by a data security policy.

12. The computer program product of claim 7, the stored program instructions further comprising:
responsive to masking the data, receiving, by the one or more computer processors, data input replacing at least a portion of the masked data; and
returning, by the one or more computer processors, the masked data to an original value.

13. A computer system for masking data in a software application associated with a mobile computing device, the computer system comprising:
one or more computer processors;
one or more computer readable storage device;
program instructions stored on the one or more computer readable storage device for execution by at least one of the one or more computer processors, the stored program instructions comprising:
program instructions to receive a request to display data in a software application on a mobile computing device;
program instructions to determine whether one or more masking rules apply to the data, wherein program instructions to determine whether one or more masking rules apply to the data are performed by masking functionality instrumented in an application binary of one or more application programming interfaces (APIs) used by the software application for at least data display or data input, and wherein instrumentation is implemented by adding instructions to the application binary of the one or more APIs used by the software application which are able to intercept the execution of the software application and enable masking of sensitive data prior to displaying sensitive data;
responsive to determining that one or more masking rules apply to the data, program instructions to mask, based on the one or more masking rules, the data, wherein program instructions to mask are performed by masking functionality instrumented in the application binary of the one or more APIs used by the software application;
program instructions to receive a request to perform a sensitive action on a screen of the mobile computing device;
program instructions to mask the screen of the mobile computing device to prevent the sensitive action; and
program instructions to display a message on the screen of the mobile computing device, wherein the message indicates that the user is not authorized to view the requested data.

14. The computer system of claim 13, wherein the masking functionality instrumented in the application binary of the one or more APIs used by the software application is designed to prevent a display of sensitive data to an unauthorized user.

15. The computer system of claim 13, wherein the one or more masking rules includes at least one or more context-based rules and one or more content-based rules.

16. The computer system of claim 13, wherein the one or more masking rules are defined by a data security policy.

17. The computer system of claim 13, the stored program instructions further comprising:
responsive to masking the data, receiving, by the one or more computer processors, data input replacing at least a portion of the masked data; and returning, by the one or more computer processors, the masked data to an original value.

* * * * *